(12) United States Patent
Longueville et al.

(10) Patent No.: US 8,166,964 B2
(45) Date of Patent: May 1, 2012

(54) HEATER FOR USE IN AN AGRICULTURAL HOUSE

(75) Inventors: Ivan Longueville, Fayetteville, AR (US); Steven S. Boyd, Noel, MO (US); Henry C. Schubert, Neosho, MO (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 11/677,125

(22) Filed: Feb. 21, 2007

(65) Prior Publication Data

US 2007/0199564 A1 Aug. 30, 2007

Related U.S. Application Data

(60) Provisional application No. 60/777,592, filed on Feb. 28, 2006.

(51) Int. Cl.
*F24H 9/06* (2006.01)
*F24C 3/04* (2006.01)

(52) U.S. Cl. ............... 126/116 B; 126/85 R; 126/92 R; 126/85 A; 126/91 A; 219/347; 237/14

(58) Field of Classification Search .............. 126/116 B, 126/91 A, 92 B, 85 A, 85 R, 92 AC; 219/347; 119/32

See application file for complete search history.

(56) References Cited

U.S. PATENT DOCUMENTS

| | | | |
|---|---|---|---|
| 2,439,038 A | 4/1948 | Cartier | |
| 2,985,137 A * | 5/1961 | Horne | ............................ 119/307 |
| 3,403,965 A | 10/1968 | Dreisziger | |
| 3,805,763 A | 4/1974 | Cowan | |
| 4,319,125 A * | 3/1982 | Prince | ........................ 126/92 B |
| 4,390,125 A | 6/1983 | Rozzi | |
| 4,869,229 A | 9/1989 | Johnson | |
| 5,112,217 A | 5/1992 | Ripka et al. | |
| 5,353,986 A | 10/1994 | Wortman et al. | |
| 5,460,415 A | 10/1995 | Lengauer et al. | |

(Continued)

FOREIGN PATENT DOCUMENTS

WO 97/09569 3/1997

(Continued)

OTHER PUBLICATIONS

An International Search Report Dated Dec. 13, 2007; Two (2) Pages.

(Continued)

*Primary Examiner* — Steven B McAllister
*Assistant Examiner* — Nikhil Mashruwala
(74) *Attorney, Agent, or Firm* — Clark Hill PLC

(57) ABSTRACT

A radiant heater is configured to be positioned above a floor at a predetermined distance and to produce a generally quadrangular zone of heat within a predetermined temperature range, preferably between approximately eighty-five degrees Fahrenheit and one-hundred degrees Fahrenheit, on the floor. The heater includes an elongated burner assembly, an inner cone member, at least one emitter assembly and end plates which define a combustion chamber. The emitter assembly is configured to direct heat produced within the combustion chamber downwardly and outwardly to the floor to form the generally quadrangular zone of heat. A canopy is provided which directs heat heading upwardly and outwardly back downwardly toward the floor and toward the emitter assembly. A reflector pan is positioned below the burner and the emitter assembly and assists in directing the heat from the emitter assembly toward the floor. A blower assembly may be incorporated into the heater.

51 Claims, 10 Drawing Sheets

U.S. PATENT DOCUMENTS

| | | | |
|---|---|---|---|
| 5,628,303 | A | 5/1997 | Ahmady et al. |
| 5,842,854 | A | 12/1998 | Willms et al. |
| 6,132,662 | A * | 10/2000 | Preisler et al. .............. 264/241 |
| 6,786,422 | B1 * | 9/2004 | Wortman et al. .............. 237/70 |
| 7,086,855 | B2 | 8/2006 | Brice et al. |
| 2004/0154551 | A1 * | 8/2004 | Brice et al. .............. 119/320 |

FOREIGN PATENT DOCUMENTS

WO     WO9709569    *   3/1997

OTHER PUBLICATIONS

L.B. White's "New Sentinel Radiant Tube Heaters" brochure; One (1) page; No date available.

L.B. White's "Infraconic Radiant Brooders" brochure; Three (3) pages; No date available.

Cumberland's "Cumberland Heating Systems" brochure; Five (5) pages; Printed Dec. 2003.

Cumberland's "Cumberland PuraFire Radiant Brooder" brochure; Two (2) pages; Printed Dec. 26, 2002.

Cumberland's "Cumberland Radiant Tube Heater" brochure; Two (2) pages; Printed Jan. 16, 2003.

Detroit Radiant Products'"Commercial & Industrial Infra-Red Heaters Re-Verber-Ray" brochure; Eight (8) pages; No date available.

Agile Mfg., Inc./Sibley "Brooders and Heaters" brochure; Six (6) pages; No date available.

Agile Mfg., Inc./Shenandoah "Brooders Better Brooding for Your Chicks . . . Since 1924" brochure; Six (6) pages; No date available.

Printout from SBM's website www.sbm.fr of a traditional poultry house (best available copy); Two (2) pages, Jul. 17, 2007.

Printout from SBM's website www.sbm.fr of a low ceiling or widespan poultry house (best available copy); Two (2) pages, Jul. 17, 2007.

Printout from SBM's website www.sbm.fr of gas ceramic heaters (best available copy); Two (2) pages, Jul. 17, 2007.

Printout from SBM's website www.sbm.fr of a SBM ceramic brooders (best available copy); Five (5) pages, Jul. 17, 2007.

Examiner's Report which issued in connection with Australian Patent Application No. 2007220779, Sep. 13, 2010.

* cited by examiner

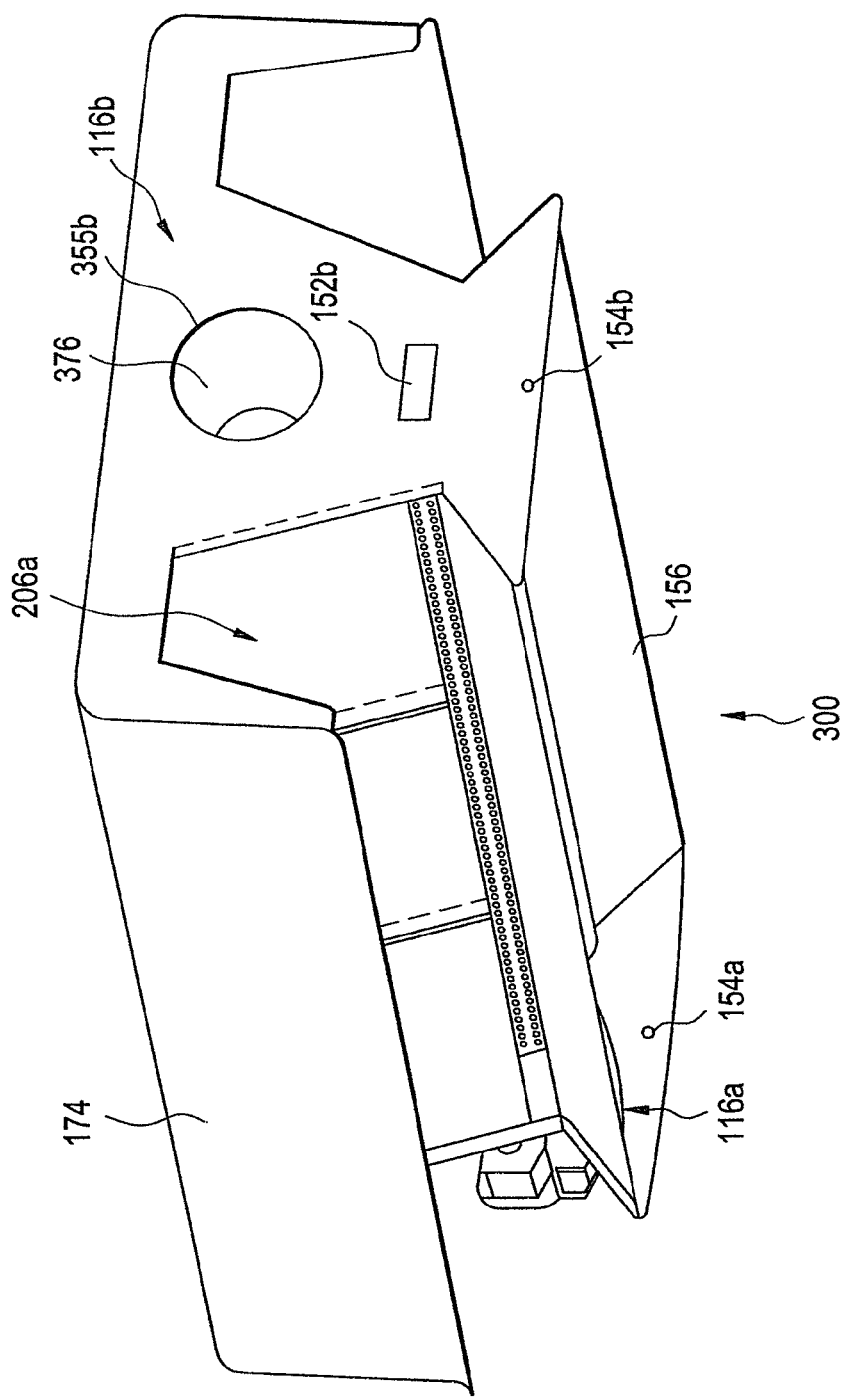

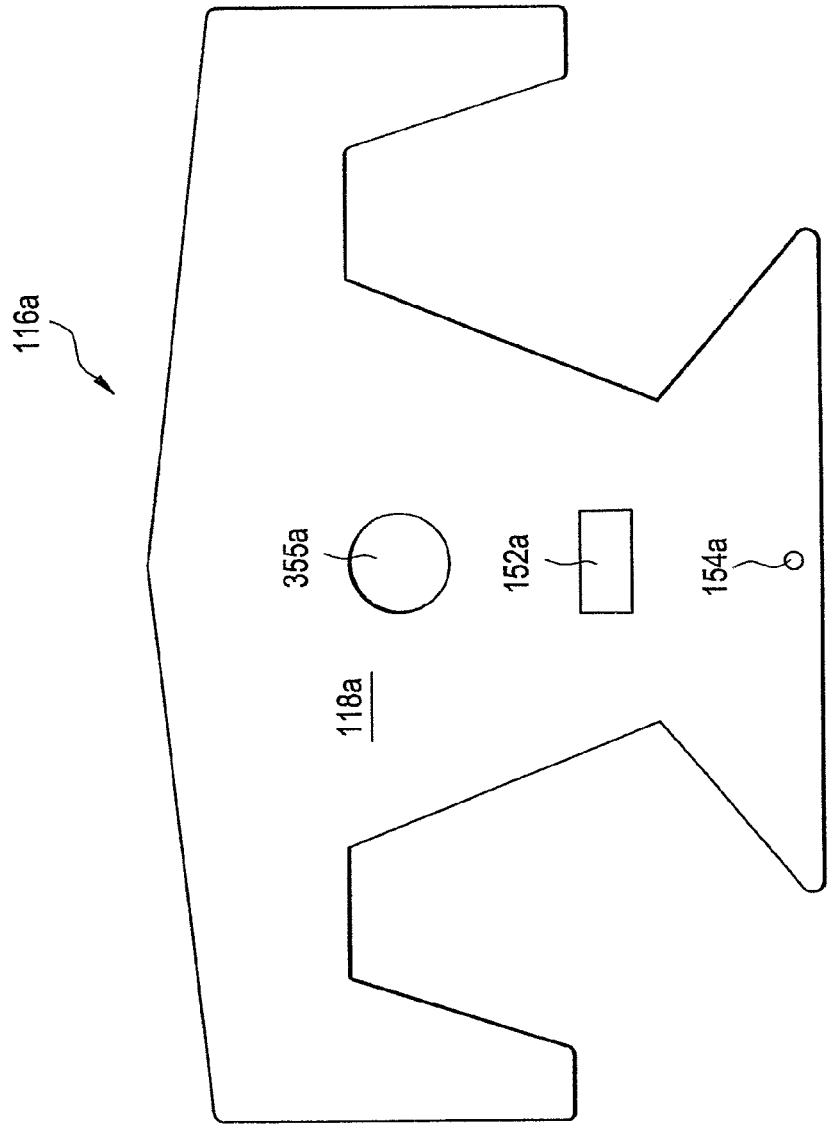

HEATER FOR USE IN AN AGRICULTURAL HOUSE

CROSS-REFERENCE AND INCORPORATION BY REFERENCE

This patent application claims the benefit of domestic priority of U.S. Provisional Application Ser. No. 60/777,592, filed Feb. 28, 2006, and entitled "New Concept Heater". U.S. Provisional Application Ser. No. 60/777,592 is hereby incorporated by reference.

FIELD OF THE INVENTION

The invention generally relates to the field of infrared heaters used in agricultural applications, such as in poultry houses.

BACKGROUND OF THE INVENTION

Infrared heat has been widely adapted over forced air heat in the environment of a poultry house 40 primarily because radiant heat more efficiently provides heat directly to the floor 45 without the need to heat the entire air space enclosed by the walls 47 and the ceiling (not shown) of the poultry house 40. In the past, radiant heat has been provided in poultry houses 40 utilizing propane or natural gas-fired heaters in:

(a) a circular shape with a ceramic disc to create a small percentage of its input as infrared heat (commonly referred to as a "pancake brooder" 50);

(b) a circular shaped perforated emitter (commonly referred to as a "radiant brooder" 55);

(c) a rectangular shaped heater with a relatively open design (commonly referred to as a "ceramic brooder" 60), of the type manufactured by SBM International, which is positioned at an angle in order to direct heat angularly downwardly toward the floor 45; or (d) in the shape of a long tubular pipe (commonly referred to as a "tube heater" 65).

One disadvantage associated with these different types of radiant heaters 50, 55, 60, 65 is the production of heat patterns that create large hot areas 70 and large first and second cold areas 75, 80 of the floor 45. Birds in a poultry house 40 during the brood time perform best within a fifteen (15) degree temperature spread ("the comfort zone" 85) on the floor 45. The comfort zone 85 is typically between approximately eighty-five and one hundred degrees (85°-100°) Fahrenheit. The hot areas 70 are typically those areas above approximately one-hundred degrees (100°) Fahrenheit. The first cold areas 75 are typically those areas between approximately eighty and eighty-five degrees (80°-85°) Fahrenheit. The second cold areas 80 are typically those areas below approximately eighty degrees (80°) Fahrenheit. The greater percentage of infrared heat output that is put on the floor 45 within the comfort zone 85, the more efficient the heater is. FIG. 1 generally illustrates the temperature spread on the floor 45 between the walls 47 associated with both a pancake brooder 50 (shown on left-hand side) and a radiant brooder 55 (shown on the right-hand side); it is to be understood that the heaters 50, 55 are positioned at a predetermined position above the floor 45. FIG. 2 generally illustrates the temperature spread on the floor 45 between the walls 47 associated with a ceramic brooder 60 (shown on the left-hand side) and with a tube heater 65 (shown on the right-hand side); it is to be understood that the heaters 60, 65 are positioned at a predetermined position above the floor 45.

Thus, there is a need for a heater for use in a poultry house 40 which reduces the hot and cold areas 70, 75, 80 on the floor 45 of the poultry house 40, and thus increases the size of the comfort zone 85 on the floor 45 of the poultry house 40.

SUMMARY OF THE INVENTION

Briefly, and in accordance with the foregoing, the invention provides a radiant heater which is configured to be positioned above a floor at a predetermined distance and to produce a generally quadrangular zone of heat within a predetermined temperature range (preferably between approximately eighty-five degrees Fahrenheit and one-hundred degrees Fahrenheit) on the floor. The heater includes first and second end plates having inner and outer surfaces. The heater also has a burner assembly which has an elongated burner which extends at least partially between the inner surfaces of the first and second end plates. An inner cone member is positioned above the burner and extends between the end plates, and defines an inner cone cavity. Insulation may be provided within the inner cone cavity. Emitter assemblies extend between the end plates such that a combustion chamber is defined between the emitter assemblies, the inner cone member, the end plates and the burner. A reflector pan is positioned below the burner and the emitter assemblies. A canopy is secured to the end plates and extends over the heater and around a portion of the heater. The heater may also have a blower assembly which extends through the inner cone cavity.

The burner assembly is configured to produce heat within the combustion chamber and to heat the emitter assemblies and the inner cone member. The insulation redirects the heat from the inner cone member back toward the emitter assemblies. The end panels restrict the loss of heat out of the ends of the heater and direct it back toward the emitter assemblies. The emitter assemblies are configured to direct a substantial portion of the heat downwardly and outwardly toward the floor in order to produce the generally quadrangular zone of heat. The canopy directs heat heading toward the sidewalls or the ceiling, rather than toward the floor, back toward the emitter assemblies such that the heat will be redirected back toward the floor. The reflector pan further assists in directing the heat toward the floor. If included in the heater, the blower assembly cools the heater, directs the ambient air within the poultry house through the heater, and stirs the air within the poultry house.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIGS. 10 and 11 are perspective views of the heater which incorporates features of a second embodiment of the invention; and FIG. 12 is a side view of one of the end plates used to form the heater of the second embodiment.

DETAILED DESCRIPTION OF THE ILLUSTRATED EMBODIMENTS

Figure 1:
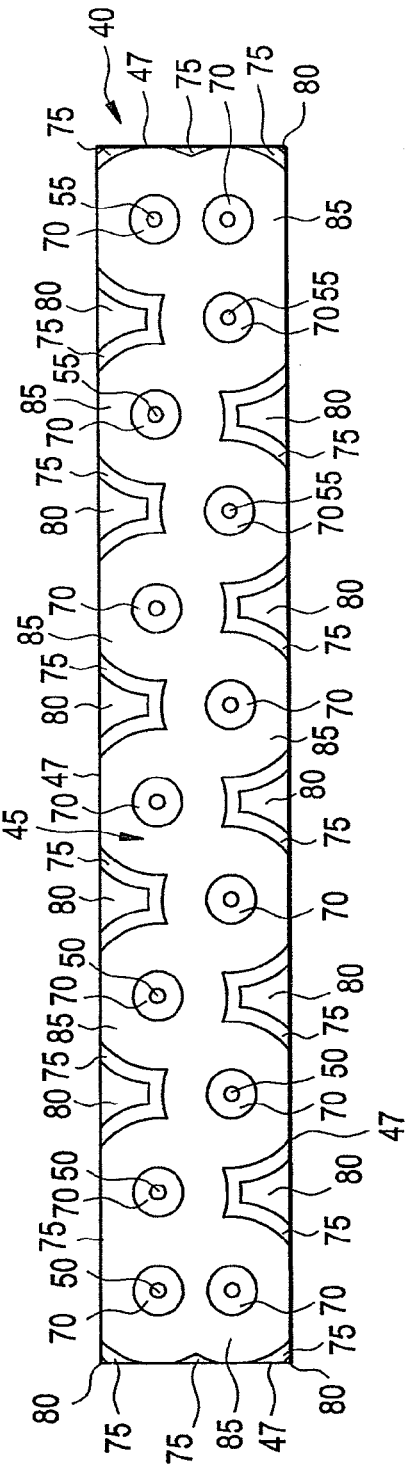
FIG. 1 illustrates a top view of a floor of a poultry house and the different zones of heat that are produced on the floor by prior art pancake and radiant brooders.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

A first embodiment of the heater 100 which incorporates features of the invention is shown in FIGS. 3-9; and a second embodiment of the heater 300 which incorporates features of the invention is shown in FIGS. 9-12.

The assembly of the heater 100 will first be discussed. The heater 100 includes a burner assembly 102. The burner assembly 102 includes a burner 104, an igniter 106, an igniter control 108, a connecting wire 110, and a gas control 112. The burner 104 is preferably a straight, elongated tube-like member having opposite ends. The igniter control 108 and the gas control 112 are provided at one of the ends of the burner 104. The burner 104 has ports (including cross-over ports to light the opposite side of the burner 104) 114 provided therethrough which are sized and arranged to produce even heat along a length thereof. The igniter 106 is secured in place (as will be discussed further herein) proximate to the end of the burner 104 where the igniter and gas controls 108, 112 are provided. The igniter 106 is connected to the igniter control 108 by the connecting wire 110 in order to receive signals from the igniter control 108.

The heater 100 also includes first and second end plates 116a, 116b. The end plates 116a, 116b are generally identical and therefor only the first end plate 116a will be described in detail with reference to FIG. 7 with the understanding that the description of the second end plate 116b would be generally identical.

The first end plate 116a has inner and outer surfaces 118a, 120a. The first end plate 116a also has a number of edges which form the first end plate 116a into a generally E-shaped, albeit rotated ninety degrees, member. First and second top edges 122a, 124a extend angularly downwardly and outwardly from one another. First and second outer side edges 126a, 128a extend straight downwardly from ends of the top edges 122a, 124a, respectively. First and second lower edges 130a, 132a extend inwardly from ends of the outer side edges 126a, 128a, respectively. First and second inner side edges 134a, 136a extend angularly upwardly and inwardly from ends of the lower edges 130a, 132a. Third and fourth inner side edges 138a, 140a extend straight inwardly from ends of the inner side edges 134a, 136a. Fifth and sixth inner side edges 142a, 144a extend angularly downwardly and inwardly from ends of the inner edges 138a, 140a. Seventh and eighth inner side edges 146a, 148a extend angularly downwardly and outwardly from ends of the inner edges 142a, 144a. Third lower edge 150a extends straight between ends of the inner side edges 146a, 148a.

The first end plate 116a also has a first aperture 152a which extend therethrough between the fifth and sixth inner side edges 142a, 144a, but proximate to where the fifth and sixth inner side edges 142a, 144a meet the seventh and eighth inner side edges 146a, 148a, respectively. The first end plate 116a further has a second aperture 154a which extends therethrough between the seventh and eighth inner side edges 146a, 148a and above the third lower edge 150a.

The burner 104 at one end thereof is secured within the first aperture 152b of the second end plate 116b. The burner 104 also extends through the first aperture 152a of the first end plate 116a such that the igniter control 108 and the gas control 112 are provided proximate the outer surface 120a of the first end plate 116a. The igniter 106 is positioned between the first and second end plates 116a, 116b. The connecting wire 110 extends through the second aperture 154a of the first end plate 116a and connects the igniter 106 to the igniter control 108.

The heater 100 includes a reflector pan 156 has upper and lower surfaces 158, 160. The reflector pan 156 also has a number of integrally formed portion which form the reflector pan 156 into a generally C-shaped, albeit rotated ninety degrees, member. First and second portions 162, 164 extend angularly upwardly and outwardly from one another with the connection of the first and second portions 162, 164 being positioned generally below the burner 104. The edges of the first and second portions 162, 164 are preferably secured to the first and second end plates 116a, 116b approximately between where the fifth, sixth, seventh and eighth inner side edges 142a, 142b; 144a, 144b; 146a, 146b; 148a, 148b are connected to one another. The igniter 106 extends through the first portion 162 of the reflector pan 156 and is secured thereto. Third and fourth portions 166, 168 extend angularly downwardly and outwardly from the free ends of the first and second portions 162, 164, respectively. The edges of the third and fourth portions 166, 168 are preferably secured to the first and second end plates 116a, 116b preferably proximate to the seventh and eighth inner side edges 146a, 146b; 148a, 148b. Fifth and sixth portions 170, 172 extend straight downwardly from the free ends of the third and fourth portions 166, 168, respectively, such that the free ends thereof are generally flush with the third lower edges 150a, 150b of the first and second end plates 116a, 116b.

The heater 100 includes a canopy 174 which has upper and lower surfaces 176, 178. The canopy 174 is secured generally at its ends around the top edges 122a, 122b; 124a, 124b and the outer edges 126a, 126b; 128a, 128b of the end plates 116a, 116b and, thus, extends between the end plates 116a, 116b and over the burner 104, the igniter 106 and the reflector pan 156. Flange members 175 further extend around the edges 122a, 122b; 124a, 124b; 126a, 126b; 128a, 128b of the end plates 116a, 116b. The canopy 174 is thus generally C-shaped in configuration.

The heater 100 includes an inner cone 180. The inner cone 180 includes a base member 182, first and second leg members 184a, 184b, and first and second flange members 186a, 186b, all of which are preferably integrally formed. The base member 182 extends between and abuts against the inner surfaces 118a, 118b of the first and second end plates 116a, 116b generally directly above where the first apertures 152a, 152b are provided. The first and second leg members 184a, 184b extend upwardly and outwardly (in opposite directions) from opposite sides of the base member 182, such that the base member 182 and the leg members 184a, 184b are generally V-shaped in configuration, and such that flanges 185a, 185*b* at the ends of the leg members 184*a*, 184*b* abut against the inner surfaces 118*a*, 118*b* of the end plates 116*a*, 116*b* to be secured thereto. An inner cone cavity 187 is thus generally formed between the end plates 116*a*, 116*b*, the base member 182 and the leg members 184*a*, 184*b*. The first and second flange members 186*a*, 186*b* extend outwardly from the free ends of the leg members 184*a*, 184*a*. Each flange member 186*a*, 186*b* has a first portion 188*a*, 188*b*, a second portion 190*a*, 190*b*, and a third portion 192*a*, 192*b*. The first portion 188*a*, 188*b* extends (in opposite directions) from the leg member 184*a*, 184*b* and is generally planar therewith. The second portion 190*a*, 190*b* extends straight outwardly from the free end of the first portion 188*a*, 188*b*. The third portion 192*a*, 192*b* extends straight downwardly from the free end of the second portion 190*a*, 190*b*. Each flange member 186*a*, 186*b* is preferably secured to each of the end plates 116*a*, 116*b*, preferably along the second portion 190*a*, 190*b* thereof.

The heater 100 includes insulation 194. The insulation 194 is a layered material having a predetermined thickness, for instance one-half of an inch, which is provided on top of a portion of the inner cone 180, namely over the base member 182 and the first and second legs 184*a*, 184*b*. The insulation 194 is also preferably provided, which extends generally perpendicularly to the insulation over the base member 182, against the end plates 116*a*, 116*b* at the ends of the inner cone cavity.

The heater 100 also includes first and second C-shaped flanges 196*a*, 196*b*, with each flange 196*a*, 196*b* being secured to each of the end plates 116*a*, 116*b* on either side of the first aperture 152*a*, 152*b*. Each C-shaped flange 196*a*, 196*b* has a base member 198*a*, 198*b*, a first leg member 200*a*, 200*b* which extends upwardly and generally perpendicularly from one end of the base member 198*a*, 198*b*, and a second leg member 202*a*, 202*b* which extends upwardly and generally perpendicularly from (such that it is parallel, but spaced from, the first leg member 200*a*, 200*b*) the opposite end of the base member 198*a*, 198*b*, such that a channel 204*a*, 204*b* is provided by the flange 196*a*, 196*b*. The base member 198*a*, 198*b* is generally perpendicular to the fifth and sixth inner side edges 142*a*, 142*b*; 144*a*, 144*b* of the end plates 116*a*, 116*b*.

The heater 100 includes first and second emitter assemblies 206*a*, 206*b*. The emitter assemblies 206*a*, 206*b* are generally identical and therefor only the first emitter assembly 206*a* will be described in detail with reference to FIG. 8 with the understanding that the description of the second emitter assembly 206*b* would be generally identical.

The emitter assembly 206*a* includes one or more, preferably six, emitter panels 208*a*. The emitter panels 208*a* are preferably each formed of stainless steel. Each emitter panel 208*a* has a generally planar screen portion 210*a* which is generally rectangular in configuration. At an upper end of the screen portion 210*a*, a top portion 212*a* extends outwardly from the screen portion 210*a* at an angle relative to the screen portion 210*a*. At the side ends of the screen portion 210*a*, first and second side portions 214*a*, 216*a* extend outwardly from the screen portion 210*a* at an angle relative to the screen portion 210*a*. Preferably, the first and second side portions 214*a*, 216*a* are perpendicular to the screen portion 210*a*, but are parallel to and spaced apart from one another. The emitter panels 208*a* are preferably placed one next to another such that all of the screen portions 210*a* are planar with one another and such that the first side portion 214*a* on one emitter panel 208*a* will be in direct contact with the second side portion 216*a* on an adjacent emitter panel 208*a*. The screen portions 210*a* are preferably perforated such that a plurality of small apertures or perforations 218*a* are provided through the screen portions 210*a*. Each of the emitter panels 208*a* are positioned such that a lower end thereof is sitting within the channel 204*a* of the flange member 196*a*, and thus is positioned against the base member 198*a* of the flange member 196*a*. Each of the emitter panels 208*a* are also positioned such that the top portion 212*a* thereof is abutting against the third portion 192*a* of the flange member 186*a* of the inner cone 180, thus further holding the emitter panels 208*a* in place. Each emitter assembly 206*a*, 206*b* preferably abuts against both the end panels 116*a*, 116*b*. Thus, each emitter panel 208*a* is essentially flat (the screen portion 210*a*) with formed edges (top, first side and second side portions 212*a*, 214*a*, 216*a*) around the perimeter. If desired, the emitter panels 208*a* may be provided with stiffening ribs (not shown) on the screen portion 210*a*.

The heater 100 includes a combustion chamber 220 which is defined between the inner cone 180, the emitter assemblies 206*a*, 206*b*, the burner 104 and the igniter 106. The combustion chamber 220 is closed off at the top thereof by the abutment of the top portions 212*a*, 212*b* of the emitter panels 208*a*, 208*b* against the third portions 192*a*, 192*b* of the flange members 186*a*, 186*b* of the inner cone 180. The combustion chamber 220 is further closed off at its ends by the end panels 116*a*, 116*b*.

The heater 100 includes a heat shield 222 which is secured to the outer surface 120*a* of the first end plate 116*a*. The heat shield 222 generally surrounds and protects the igniter and gas controls 108, 112 and at least a portion of the connecting wire 110.

The heater 100 further includes first, second, third and fourth deflectors 224*a*, 224*b*, 224*c*, 224*d*. The first and second deflectors 224*a*, 224*b* extend outwardly from the outer surface 120*a* of the first end plate 116*a* and the third and fourth deflectors 224*c*, 224*d* extend outwardly from the outer surface 120*b* of the second end plate 116*b*. The first and third deflectors 224*a*, 224*c* are generally identical and therefor only the third deflector 224*c* will be described in detail with reference to FIG. 4 with the understanding that the description of the first deflector 224*a* would be generally identical. It is also to be understood that the second and fourth deflectors 224*b*, 224*d* are generally mirror images of the first and third deflectors 224*a*, 224*c* and, therefore, will not be described herein.

The third deflector 224*c* extends outwardly from the second end panel 116*b*, and is secured to (in any appropriate manner) the second end panel 116*b*. The third deflector 224*c* has an upper planar portion 226*c* which extends outwardly from the second end panel 116*b* generally between a position proximate to the first outer side edge 126*a* and a position generally above the third inner side edge 138*a*, proximate to the connection of the fifth inner side edge 142*a*. The third deflector 224*c* has a first tab portion 228*c* which extends downwardly from one side of the upper planar portion 226*c* and which extends outwardly from a position along the first outer side edge 126*a*. The third deflector 224*c* has a second tab portion 230*c* which extends downwardly from an opposite side of the upper planar portion 226*c* and which extends outwardly from a position along the fifth inner side edge 142*a*. The third deflector 224*c* has a third tab portion 232*c* which extends downwardly from a free end of the upper planar portion 226*c*, generally between the first and second tab portions 228*c*, 230*c*. The first tab portion 228*c* may have apertures 234*c* provided therethrough if desired.

Operation of the heater 100 will now be discussed. When heat is required in the poultry house 240, having a floor 245 and sidewalls 247, the ignitor control 108 turns on the gas control 112 such that flue gas is emitted from the burner 114 and into the combustion chamber 220. The ignitor control 108 further causes the igniter 106 to spark and light a flame within the combustion chamber 220, which is generally wedge-shaped and of a size required for complete combustion. After ignition, the ignitor control 108 monitors the flame and shuts off the flue gas if the flame is lost.

The flame, which produces heat in and of itself and, thus, heats the emitter assemblies 206a, 206b (it should be noted that the heater 100 may be a single directional heater which would basically be one half of the heater 100 as described such that the cross-over ports would be removed from the burner 104 and only a single emitter assembly 206a would be heated by the flame), further causes the flue gas to combust within the combustion chamber 220, thus generating more heat within the combustion chamber 220. The generated heat further heats up the emitter assemblies 206a, 206b and the emitter assemblies 206a, 206b are configured and positioned as described hereinabove in order to direct the heat outwardly and downwardly from the heater 100 to the floor 245 of the poultry house 240. The canopy 174 is configured and positioned as described hereinabove to reflect heat heading toward the ceiling or the side walls 247 of the poultry house 240 back toward the emitter assemblies 206a, 206b in order to further heat up the emitter assemblies 206a, 206b, and downward to the reflector pan 156. The redirection of the heat by the canopy 174 reduces the radiant heat loss to the side walls 247 and the ceiling of the poultry house 240 and further raises the temperature of the emitter assemblies 206a, 206b, such that the efficiency of the emitter assemblies 206a, 206b is increased. The reflector pan 156 further reflects the radiant heat to the floor 245 of the poultry house 240. The heating taking place in the combustion chamber 220 also heats the inner cone 180 to a point where it emits radiant heat onto the emitter assemblies 206a, 206b in order to increase the temperature of the emitter assemblies 206a, 206b, and through the perforations 218a, 218b in the emitter assemblies 206a, 206b. The insulation 194 within the inner cone 180 reflects the heat of the inner cone 180 outward toward the emitter assemblies 206a, 206b and away from the canopy 174.

The canopy 174, including the flange members 175 also restricts the flow of the combustion and flue gases to increase the amount of heat generated by the heater 100 as the combustion and flue gases are forced back toward the emitter assemblies 206a, 206b rather than escaping toward the side walls 247 or the ceiling through the perforations 218a, 218b in the end plates 116a, 116b. The end plates 116a, 116b further restrict the flow of heat and the combustion and flue gases out of the ends of the heater 100. The deflectors 224a, 224b, 224c, 224d at the ends of the heater 100 disperse and dilute the combustion and/or flue gases as they exit the heater 100, and further assist in reflecting radiant heat toward the floor 245. The provision of the deflectors 224a, 224b, 224c, 224d thus reduce the amount of clearance needed above the heater 100 during operation.

Figure 2:
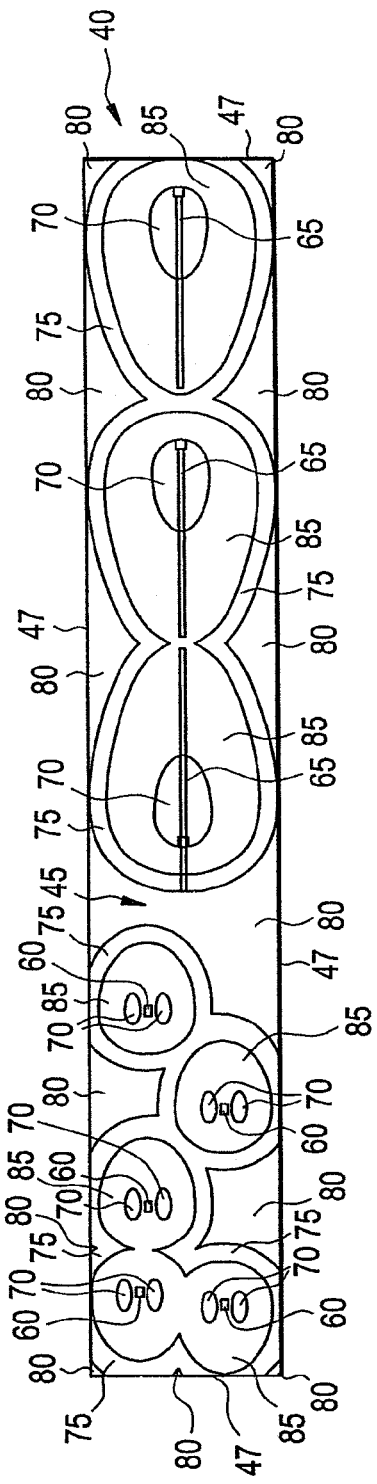
FIG. 2 illustrates a top view of a floor of a poultry house and the different zones of heat that are produced on the floor by prior art ceramic brooders and tube heaters.
Figure 3:
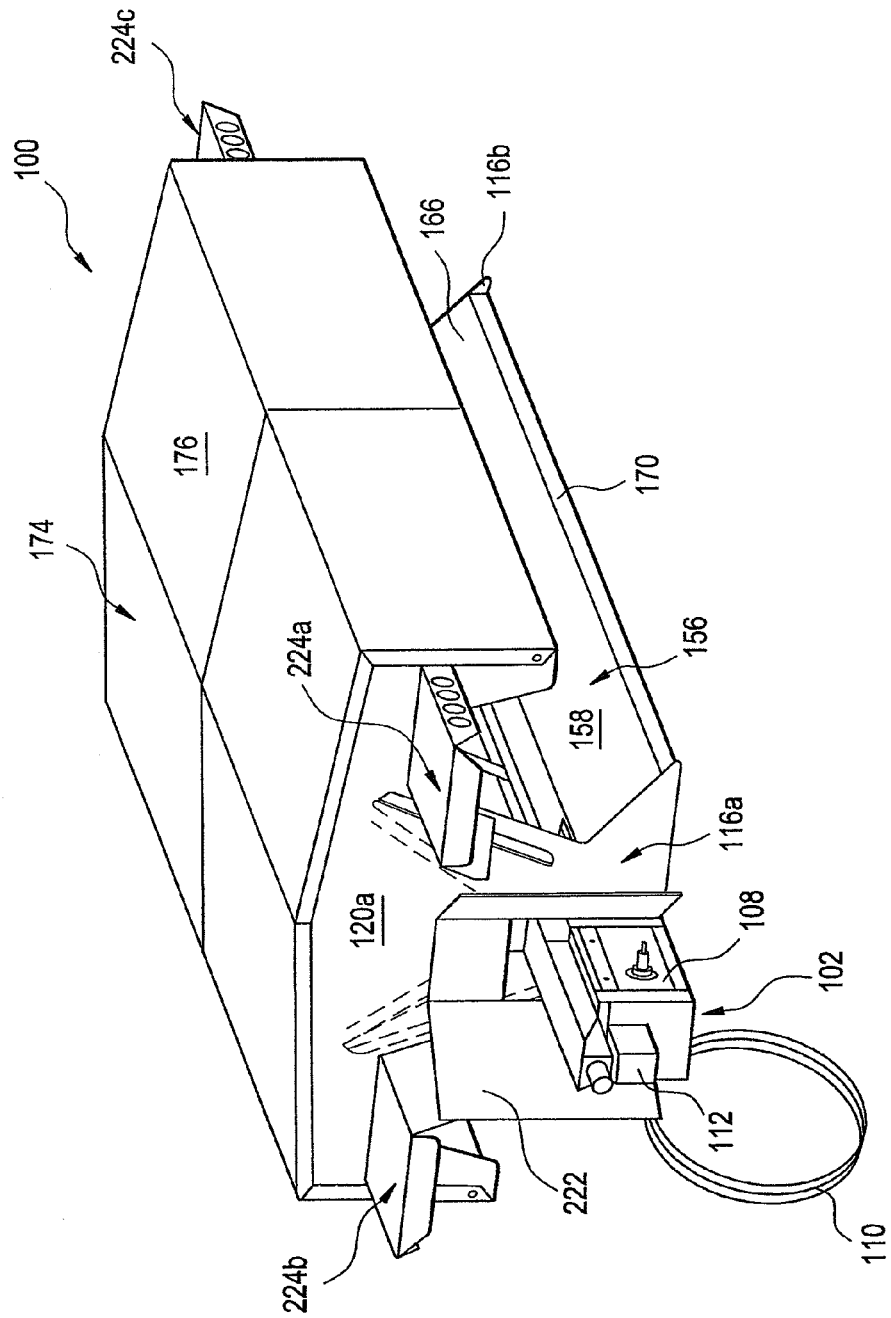
FIGS. 3 and 4 are perspective views of a heater which incorporates features of a first embodiment of the invention.
Figure 4:
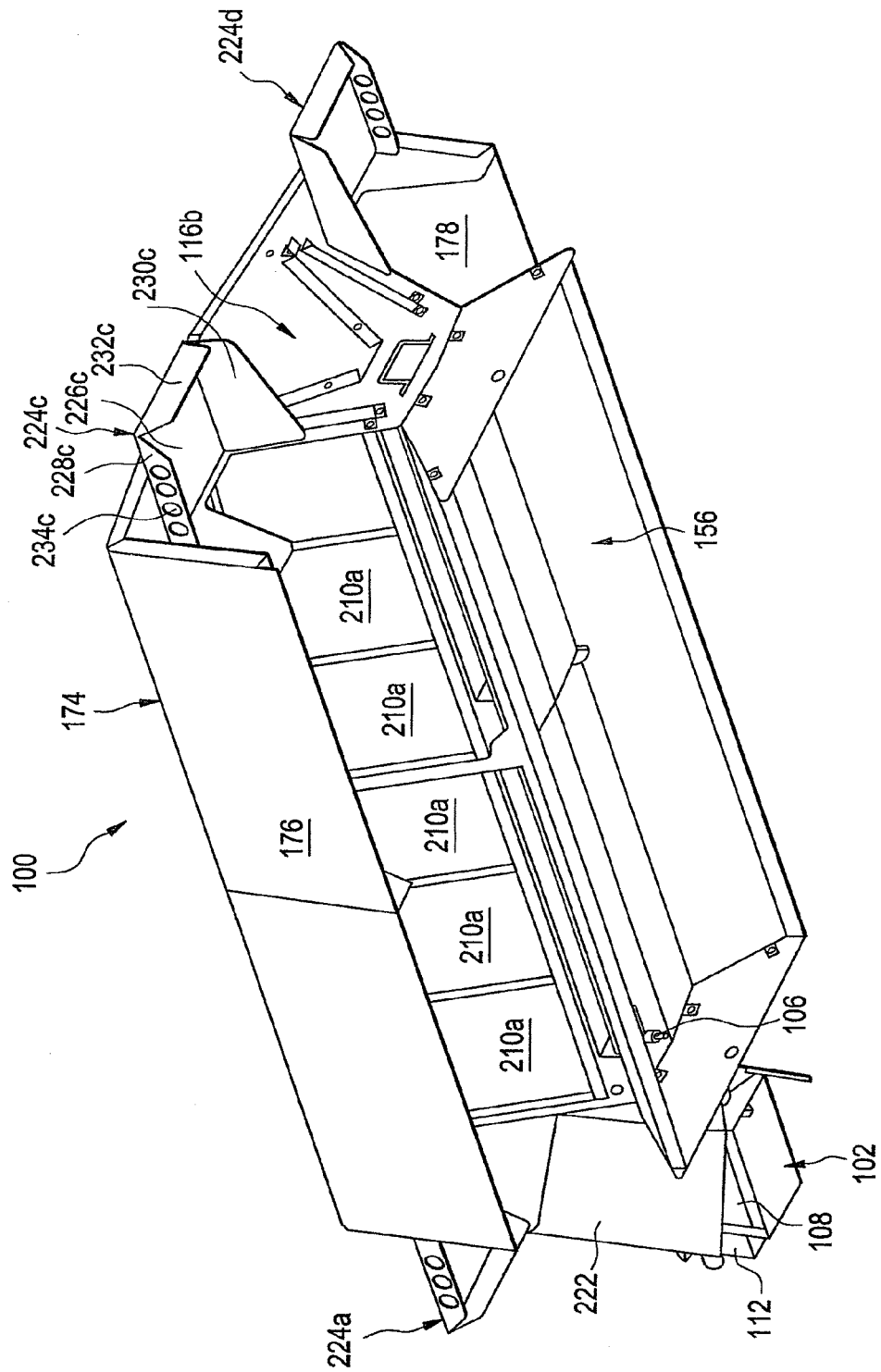
Figure 5:
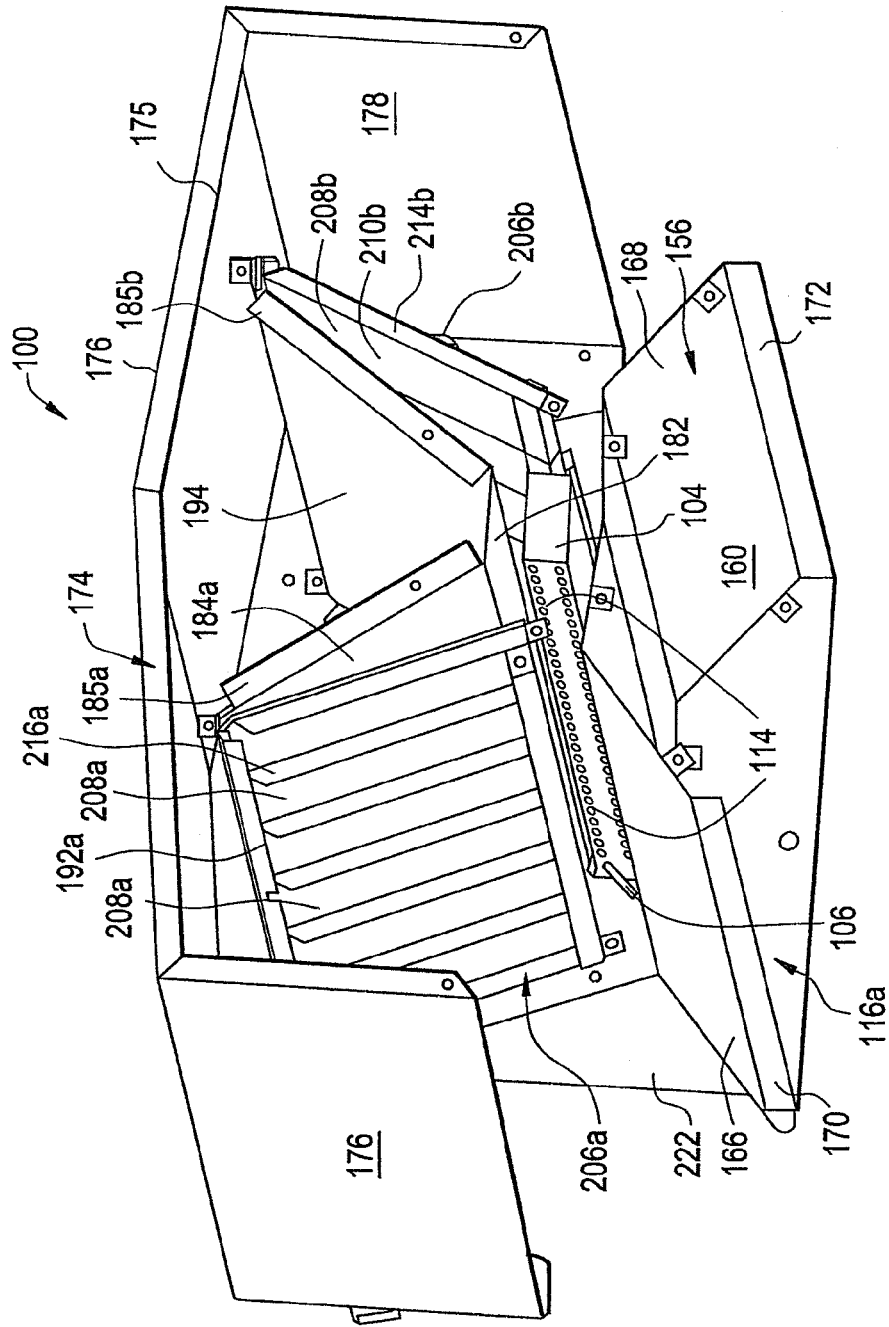
FIG. 5 is a perspective view of the heater of FIGS. 3 and 4 with one of the end plates and some insulation removed.
Figure 6:
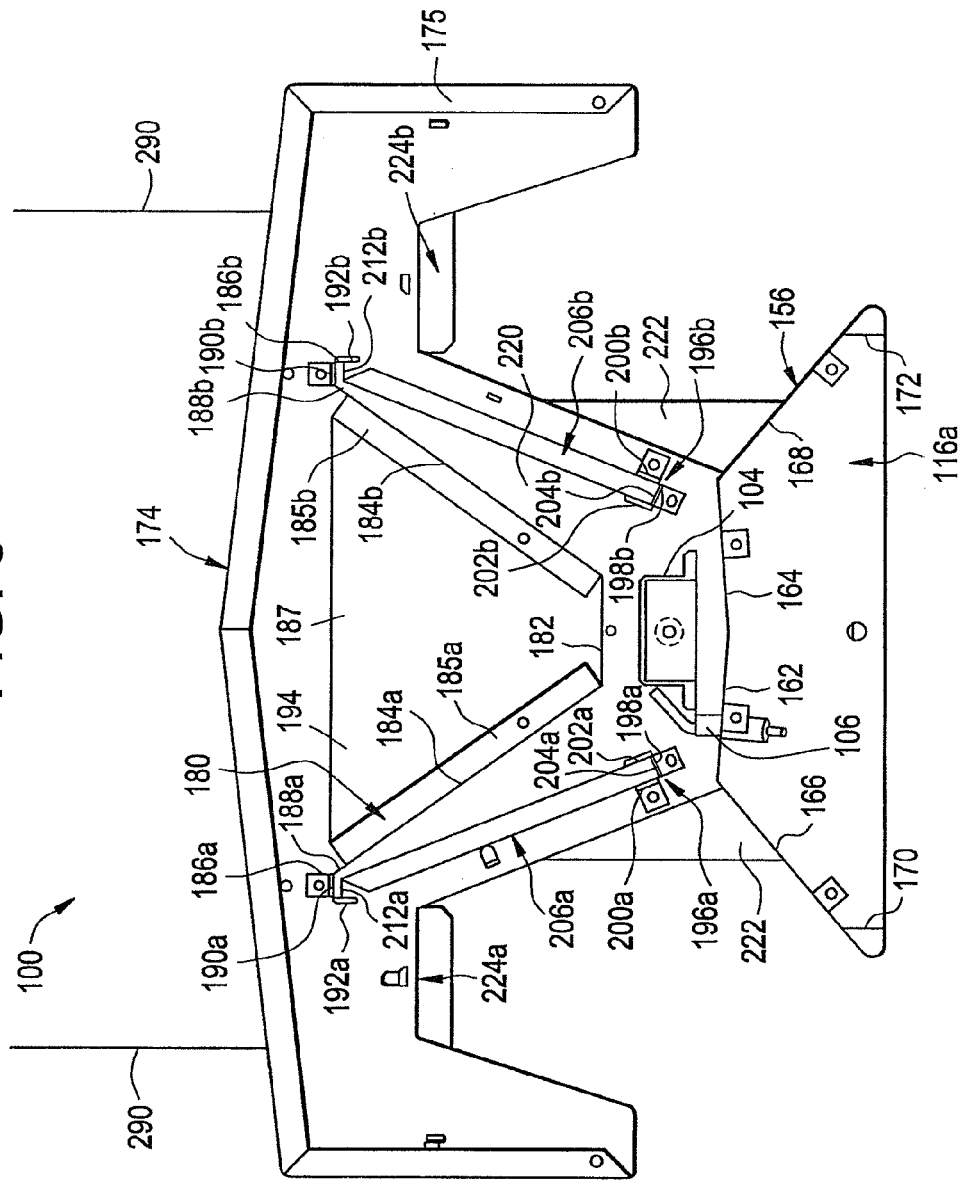
FIG. 6 is a side view of the heater of FIGS. 3 and 4 with one of the end plates and some insulation removed.
Figure 7:
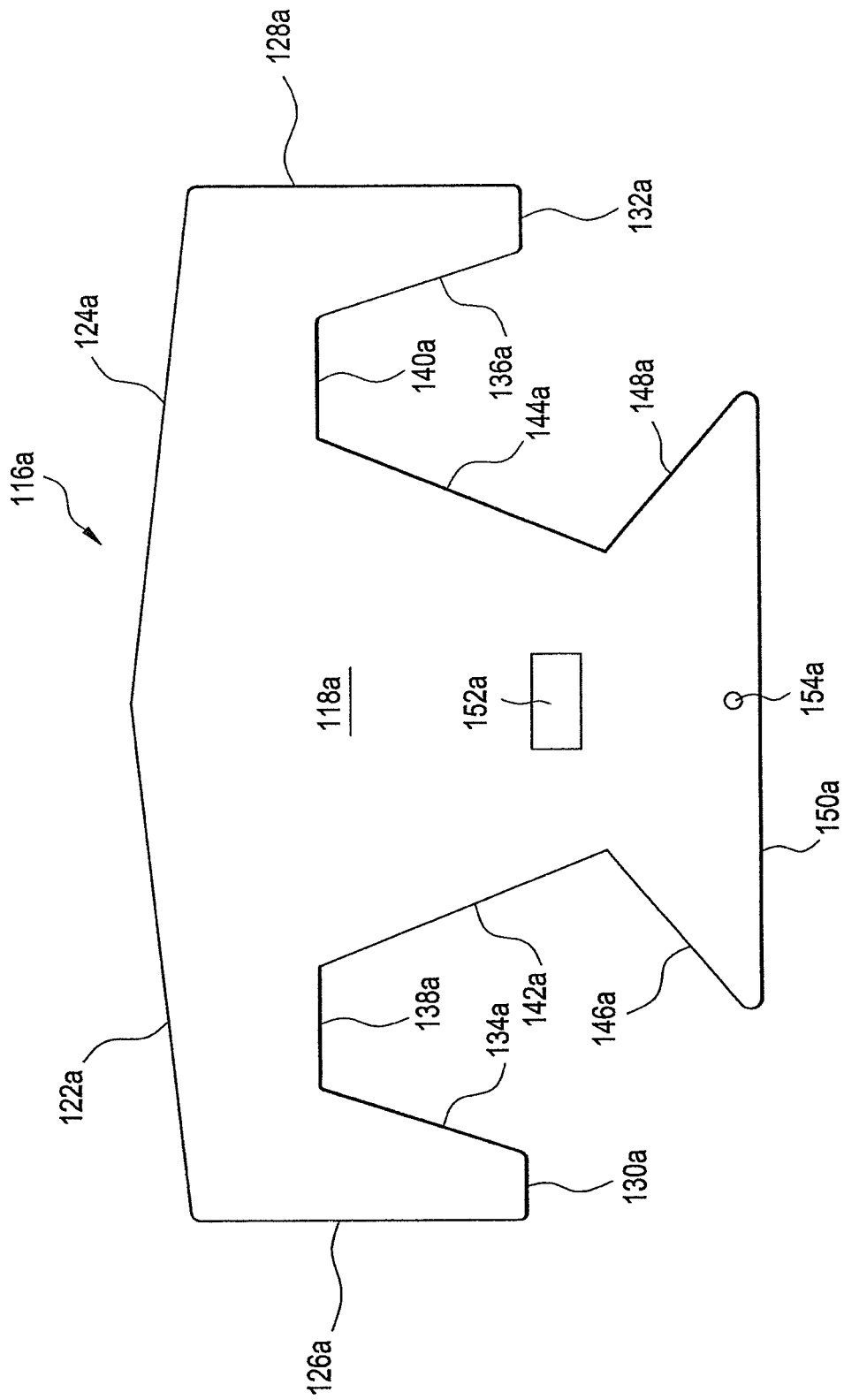
FIG. 7 is a side view of one of the end plates used to form the heater of the first embodiment.
Figure 8:
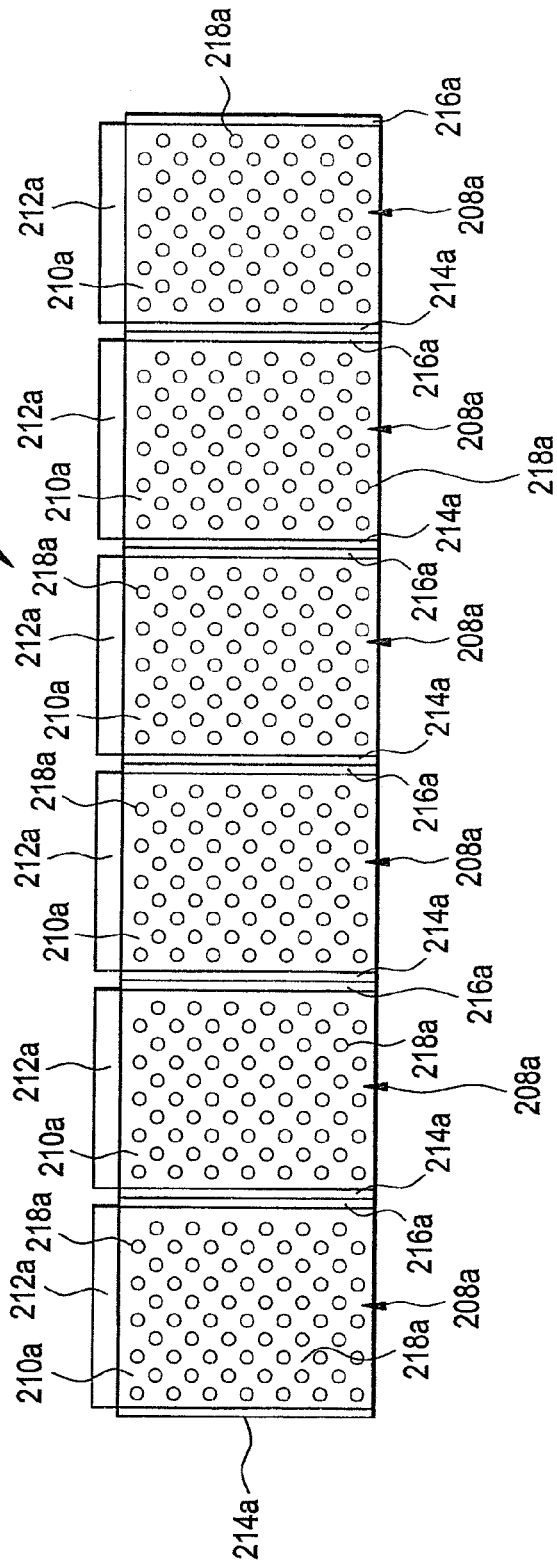
FIG. 8 is a side view of one of the emitter assemblies used to form the heater of the first embodiment.
Figure 9:
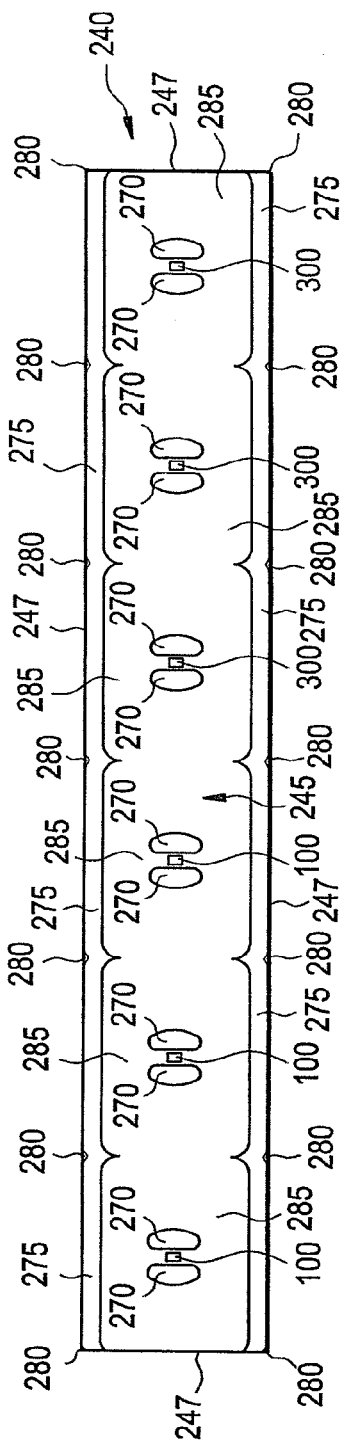
FIG. 9 illustrates a top view of a floor of a poultry house and the different zones of heat that are produced on the floor by the heaters of the present invention.

The directing of the radiant heat to the floor 245 by the emitter assemblies 206a, 206b, the canopy 174 and the reflector pan 156 generates a comfort zone 285 on the floor 245 which is generally quadrangular in configuration. As illustrated in FIG. 9 (shown with the heaters 100, although it is to be understood that the heaters 100 are positioned at a predetermined position above the floor 245), the quadrangular comfort zone 285 generated by the heater 100 (shown on the left-hand side) is larger than the comfort zones 285 generated by the known prior art heaters 50, 55, 60, 65, illustrated in FIGS. 1 and 2. The quadrangular comfort zone 285 also more closely matches the shape of areas and/or pens found in the heating requirements for poultry and other livestock. The quadrangular comfort zone 285 generated by the heater 100, thus, also produces smaller or reduced hot areas 270 and smaller or reduced first and second cold areas 275, 280, as illustrated in FIG. 9, compared to the hot areas 70 and the first and second cold areas 75, 80 generated by the known prior art heaters 50, 55, 60, 65, as illustrated in FIGS. 1 and 2. Less radiant heat is lost on the sidewalls 247 and the ceiling by focusing nearly all of the generated radiant heat to the floor 245, thus increasing the amount of heat on the floor 245 where it is needed.

The larger comfort zone 285 generated by the heater 100 further results in increased fuel efficiency as the excessive heat in the hot areas 270 tends to drive the birds away from that area and subsequently that heat is lost to the air and not used to heat the birds. Thus, it is desirable to reduce the amount of, or size of, the hot areas 270 as the heater 100 has done.

It is also desirable to reduce the amount of, or size of, the first and second cold areas 275, 280 as the heater 100 has done because the cold areas 275, 280 cause the birds to huddle together in order to keep warm and, as such, the birds tend to not go to the feed and water lines, which in turn affects weight gain and feed conversion.

If desired, the reflector pan 156 may be fixed in configuration or may be adjustable if a smaller or larger comfort zone 285 is required. Likewise, if desired, the canopy 174 may be fixed in configuration or may have adjustable ends if a smaller or larger comfort zone 285 is required.

The heater 100 may be suspended, preferably by a winch cable assembly 290 (of a generally known construction), to a ceiling or trusses within a poultry house 240, such that the heater 100 can be winched to the ceiling when not in use or lowered for periodic cleaning and maintenance. The suspension of the heater 100 in this manner affords more clearance for equipment and allows easier access for maintenance.

Attention is invited to FIGS. 9-12 and the second embodiment of the heater 300. The heater 300 is identical to the heater 100, except as described hereinbelow and, therefore, a complete description of the heater 300 will not be provided with the understanding that the pertinent description of the heater 300 is provided for with reference to the heater 100.

Figure 10:
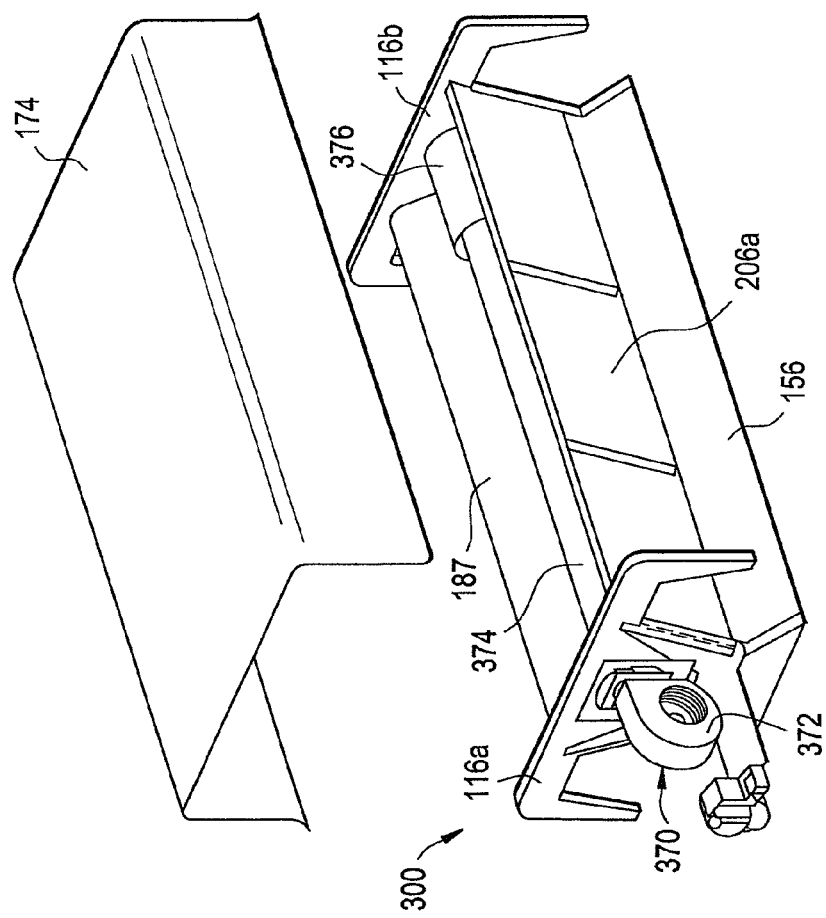

Initially, the heater 300 is illustrated as having a flat top, rather than a peaked top as illustrated in the heater 100. It is to be understood that the heaters 100, 300 may have either a flat top (as illustrated in FIGS. 10 and 11) or a peaked top (as illustrated in FIGS. 3-6). The heater 300 also has third apertures 355a, 355b provided through the end panels 116a, 116b above where the first apertures 152a, 152b are provided. The third apertures 355a, 355b are provided to allow for a blower assembly or stir fan 370 to be incorporated into the heater 300.

The blower assembly 370 includes a blower or circulating fan 372, an inner tube 374 and an outer tube 376. The inner tube 374 extends within the inner cone cavity 187 from the third aperture 355a of the first end panel 116a toward the third aperture 355b of the second end panel 116b, but preferably does not extend all the way to the third aperture 355b. The outer tube 376 extends within the inner cone cavity 187 from the third aperture 355b of the second end panel 116b toward the third aperture 355a of the first end panel 116a, but preferably does not extend all the way to the third aperture 355a. Preferably, the outer tube 376 has a length which is only a portion of the length of the inner tube 374. The outer tube 376 has an inner diameter which is larger than an outer diameter of the inner tube 374 such that at least a portion of the inner tube 374 is positioned or protruding within the outer tube 376. The blower 372 is in communication with the inner tube 374 and is secured to the first end plate 116a outside of the inner cone cavity 187, e.g., extending outwardly from the outer surface 120a of the first end plate 116a, and above the burner 104.

In operation, the heater 300 operates in an identical manner to the heater 100, but the blower assembly 370, when activated, performs a number of advantageous activities, including: directing the ambient air within the poultry house through the inner and outer tubes 374, 376; drawing or pulling combustion and flue gases from the inner cone cavity 187, via the Venturi effect, into the outer tube 376 and out the end of the heater 300; and stirs the air within the poultry house. The activities are advantageous because they collectively cool the heater 300, help to circulate the air within the poultry house in order to minimize or reduce the convection heat from the heater 300 and that which rises off of the floor to stratify, and aid distribution along with mixing minimum ventilation air with the heated air. With the heater 300, the clearance to combustible materials may also be reduced if the blower assembly 370 is outfitted with the ability to move air over the top of the canopy 174, such that the temperature above the heater 300 may be reduced.

While preferred embodiments of the invention are shown and described, it is envisioned that those skilled in the art may devise various modifications without departing from the spirit and scope of the foregoing description and the appended claims.

The invention is claimed as follows:

1. A radiant heater configured to be positioned above a floor at a predetermined distance, said heater comprising:
    an elongated burner having a top, a bottom, a first end wall, a second end wall, a first elongated side wall and a second elongated side wall, said first and second elongated side walls having multiple ports extending along a length thereof, which generally extends from a first end of said radiant heater to a second end of said radiant heater;
    a gas control device located proximate said first end of said elongated burner;
    an elongated inner member having an elongated base portion extending along said length of said elongated burner and being generally positioned above said elongated burner;
    an elongated emitter which is generally co-extensive with said inner member to define a combustion chamber therebetween;
    a canopy which extends over said elongated inner member;
    wherein said elongated burner, said gas control device, said elongated inner member, said elongated emitter and said canopy are operatively associated with one another to produce heat and to direct a substantial portion of the produced heat toward the floor in such a manner as to produce a generally quadrangular zone of heat on the floor within a predetermined temperature range on the floor.

2. The radiant heater as defined in claim 1, wherein said predetermined temperature range is between approximately eighty-five degrees Fahrenheit and one hundred degrees Fahrenheit.

3. The radiant heater as defined in claim 1, wherein said elongated emitter comprises a plurality of emitter panels, each said emitter panel having a flat screen portion and side portions which extend outwardly therefrom, said screen portions of adjacent emitter panels being planar to one another, said side portions configured to abut against said side portions of an adjacent emitter panel.

4. The radiant heater as defined in claim 3, wherein each said screen portion has a plurality of perforations therethrough in order to allow the produced heat to exit said combustion chamber.

5. The radiant heater as defined in claim 3, wherein each said emitter panel is formed of stainless steel.

6. The radiant heater as defined in claim 4, further including first and second end plates having inner and outer surfaces, said elongated burner, said elongated inner member and said elongated emitter extending at least partially between, and being secured to, first portions of said first and second end plates, said inner surfaces of said first portions of said first and second end plates forming end boundaries to said combustion chamber such that said first portions of said first and second end plates restrict the flow of the produced heat within said combustion chamber out of ends of said heater.

7. The radiant heater as defined in claim 6, further including at least one deflector which extends outwardly from at least one of said outer surfaces of second portions of said first and second end plates which do not define end boundaries to said combustion chamber but which are positioned exterior to said elongated emitter, said at least one deflector configured to disperse and dilute gases that have exited said combustion chamber.

8. The radiant heater as defined in claim 1, wherein said elongated inner member defines an elongated inner cavity, said elongated inner member separating said elongated inner cavity from said combustion chamber.

9. The radiant heater as defined in claim 8, further including insulation within said elongated inner cavity, the heat produced in said combustion chamber heats said elongated inner member, said insulation within said elongated inner cavity reflects the heat of said elongated inner member outward toward said elongated emitter, which further heats up said elongated emitter.

10. The radiant heater as defined in claim 8, further including a blower assembly which is at least partially positioned within said elongated inner cavity.

11. The radiant heater as defined in claim 10, wherein said blower assembly includes a blower which is positioned outside of said elongated inner cavity, an inner tube member which extends from said blower and which is positioned within said elongated inner cavity, and an outer tube member which extends around a portion of said inner tube member within said elongated inner cavity, said outer tube member having an inner diameter which is larger than an outer diameter of said inner tube member.

12. The radiant heater as defined in claim 1, wherein said canopy extends over said elongated emitter, said canopy configured to reflect a portion of the produced heat back toward said elongated emitter in order to further heat up said elongated emitter.

13. The radiant heater as defined in claim 1, further including a reflector pan positioned below said elongated burner and said elongated emitter, said reflector pan being configured to further direct a substantial portion of the produced heat toward the floor in order to produce said generally quadrangular zone of heat.

14. The radiant heater as defined in claim 1, wherein said multiple ports provided along said length of said first and second elongated side walls of said elongated burner are sized and arranged to produce even heat along said length.

15. The radiant heater as defined in claim 1, further including first and second end plates having inner and outer surfaces, said elongated burner, said elongated inner member and said elongated emitter extend at least partially between said first and second end plates, said inner surfaces of first portions of said first and second end plates forming end boundaries to said combustion chamber such that said first portions of said first and second end plates restrict the flow of the produced heat in said combustion chamber out of ends of said radiant heater, wherein said elongated emitter provides a screen portion having a plurality of perforations therethrough in order to allow the produced heat to exit said combustion chamber, and further including at least one deflector which extends outwardly from at least one of said outer surfaces of second portions of said first and second end plates which do not define end boundaries to said combustion chamber but which are positioned exterior to said elongated emitter, said at least one deflector configured to disperse and dilute gases that have exited said combustion chamber, wherein said radiant heater is suspended in position above a floor by an overhead support, said radiant heater configured to be positioned proximate to the overhead support as said gases are dispersed and diluted out of said ends of said radiant heater, as opposed to a top of said radiant heater, by said at least one deflector.

16. The radiant heater as defined in claim 15, wherein said canopy further extends over elongated emitter, said canopy further being configured to prevent the exhaustion of heat and gases out of a top portion thereof, thereby further allowing said radiant heater to be positioned proximate to the overhead support.

17. The radiant heater as defined in claim 7, wherein said radiant heater is suspended in position above a floor by an overhead support, said radiant heater configured to be positioned proximate to the overhead support as said gases are dispersed and diluted out of said ends of said radiant heater, as opposed to a top of said radiant heater, by said at least one deflector.

18. The radiant heater as defined in claim 12, wherein said radiant heater is suspended in position above a floor by an overhead support, said radiant heater configured to be positioned proximate to the overhead support as said canopy is further configured to prevent the exhaustion of heat and gases out of a top portion thereof.

19. A radiant heater configured to be positioned above a floor at a predetermined distance and to produce a generally quadrangular zone of heat within a predetermined temperature range on the floor, said heater comprising:
first and second end plates having inner and outer surfaces;
an elongated burner having a top, a bottom, a first end wall, a second end wall, a first elongated side wall and a second elongated side wall, said first and second elongated side walls having multiple ports extending along a length thereof, said elongated burner extending at least partially between said inner surfaces of said first and second end plates and being secured to at least one of said first and second end plates;
a gas control device located proximate said first end of said elongated burner;
an elongated inner member having an elongated base portion extending along said length of said elongated burner and being generally positioned above said elongated burner, said elongated inner member extending between said inner surfaces of said first and second end plates and being secured to at least one of said first and second end plates, said elongated inner member and said inner surfaces of said first and second end plates defining an elongated inner cavity;
an elongated emitter which is generally co-extensive with said elongated inner member and which extends between said inner surfaces of said first and second end plates and is secured to at least one of said first and second end plates, said elongated emitter, said elongated inner member, said end plates and said elongated burner defining a combustion chamber therebetween;
a reflector pan being positioned below said elongated burner and said elongated emitter, said reflector pan extending between said inner surfaces of said first and second end plates and being secured to at least one of said first and second end plates; and
a canopy which is secured to at least one of said first and second end plates, said canopy extending over said elongated inner member and around at least a portion of said elongated emitter.

20. The radiant heater as defined in claim 19, further including insulation which separates said elongated inner member and said inner surfaces of said first and second end plates from said elongated inner cavity.

21. The radiant heater as defined in claim 19, further including a blower assembly having a blower, an inner tube and an outer tube, said blower being secured to said first end plate and extending outwardly from said outer surface of said first end plate, said inner tube member being secured to said blower and extending within said inner cavity from said inner surface of said first end plate toward said inner surface of said second end plate, said outer tube member being secured to said second end plate and extending within said elongated inner cavity from said inner surface of said second end plate toward said inner surface of said first end plate, said inner tube member protruding at least partially into said outer tube member, said outer tube member having an inner diameter which is larger than an outer diameter of said inner tube member.

22. The radiant heater as defined in claim 19, wherein said radiant heater is suspended in position above a floor by an overhead support, said radiant heater configured to be positioned proximate to the overhead support.

23. The radiant heater as defined in claim 19, wherein said canopy is configured to prevent the exhaustion of heat and gases out of a top portion thereof, thereby allowing said radiant heater to be suspended in position proximate to the overhead support.

24. The radiant heater as defined in claim 19, wherein said multiple ports in said first and second elongated side walls of said elongated burner are sized and arranged to produce even heat along said length.

25. A radiant heater configured to be positioned above a floor at a predetermined distance, said radiant heater comprising:
an elongated burner having a top, a bottom a first end wall, a second end wall, a first elongated side wall and a second elongated side wall, said first and second elongated side walls having multiple ports extending along a length thereof, which substantially extends from a first end of said radiant heater to a second end of said radiant heater;
a gas control device located proximate said first end of said elongated burner;
an elongated inner member having an elongated base and first and second elongated leg members which extend upwardly from ends of said elongated base, said elongated base being generally positioned above said elongated burner;
first and second elongated emitters, said first elongated emitter generally being positioned alongside, but separated from, said first leg member, said second elongated emitter generally being positioned alongside, but separated from, said second leg member, said elongated burner, said elongated inner member and said first and second elongated emitters defining a combustion chamber therebetween; and a canopy which extends over said elongated inner member;

wherein said elongated burner, said gas control device, said elongated inner member, said first and second elongated emitters and said canopy are operatively associated with one another to produce heat and to direct a substantial portion of the produced heat toward the floor in such a manner as to produce a generally quadrangular zone of heat on the floor within a predetermined temperature range on the floor.

26. The radiant heater as defined in claim 25, wherein said elongated burner extends from said first end of the radiant heater to said second end of the radiant heater.

27. The radiant heater as defined in claim 25, wherein said first and second elongated legs of said elongated inner member extend upwardly and outwardly from said ends of said elongated base such that said elongated inner member is generally V-shaped.

28. The radiant heater as defined in claim 25, wherein said combustion chamber is generally wedge-shaped between said first elongated leg of said elongated inner member and said first elongated emitter, and wherein said combustion chamber is generally wedge-shaped between said second elongated leg of said elongated inner member and said second elongated emitter.

29. The radiant heater as defined in claim 25, wherein said predetermined temperature range is between approximately eighty-five degrees Fahrenheit and one hundred degrees Fahrenheit.

30. The radiant heater as defined in claim 25, wherein each of said first and second elongated emitters includes a plurality of emitter panels, each said emitter panel having a flat screen portion and side portions which extend outwardly therefrom, said screen portions of adjacent emitter panels being planar to one another, said side portion configured to abut against side portions of an adjacent emitter panel.

31. The radiant heater as defined in claim 30, wherein each said screen portion has a plurality of perforations therethrough in order to allow the produced heat and gases to exit said combustion chamber.

32. The radiant heater as defined in claim 30, wherein each said emitter panel is formed of stainless steel.

33. The radiant heater as defined in claim 31, further including first and second end plates having inner and outer surfaces, said inner surfaces of first portions of said first and second end plates forming end boundaries to said combustion chamber such that said first portions of said first and second end plates restrict the flow of the produced heat and said gases within said combustion chamber out of ends of the radiant heater.

34. The radiant heater as defined in claim 33, further including at least one deflector which extends outwardly from at least one of said outer surfaces of second portions of said first and second end plates which do not define end boundaries to said combustion chamber but which are positioned exterior to at least one of said first and second elongated emitters, said at least one deflector configured to disperse and dilute said gases that have exited said combustion chamber.

35. The radiant heater as defined in claim 25, wherein said elongated inner member defines an elongated inner cavity, said elongated inner member separating said elongated inner cavity from said combustion chamber.

36. The radiant heater as defined in claim 35, further including insulation within said elongated inner cavity, the heat produced in said combustion chamber heats said elongated inner member, said insulation within said elongated inner cavity reflects the heat of said elongated inner member outward toward said first and second elongated emitters, which further heats up said first and second elongated emitters.

37. The radiant heater as defined in claim 35, further including a blower assembly which is at least partially positioned within said elongated inner cavity.

38. The radiant heater as defined in claim 37, wherein said blower assembly includes a blower which is positioned outside of said inner cavity, an inner tube member which extends from said blower and which is at least partially positioned within said elongated inner cavity, and an outer tube member which extends around a portion of said inner tube member within said elongated inner cavity, said outer tube member having an inner diameter which is larger than an outer diameter of said inner tube member.

39. The radiant heater as defined in claim 25, further including a blower assembly configured to cool the radiant heater.

40. The radiant heater as defined in claim 25, wherein said canopy further extends over said first and second elongated emitters, said canopy configured to reflect a portion of the produced heat back toward said first and second elongated emitters in order to further heat up said first and second elongated emitters.

41. The radiant heater as defined in claim 25, further including a reflector pan positioned below said elongated burner and said first and second elongated emitters, said reflector pan being configured to further direct a substantial portion of the produced heat toward the floor in order to produce said generally quadrangular zone of heat on the floor.

42. The radiant heater as defined in claim 25, wherein said radiant heater is suspended in position above a floor by an overhead support, said radiant heater configured to be positioned proximate to the overhead support.

43. The radiant heater as defined in claim 25, wherein said multiple ports of said first and second elongated side walls are sized and arranged to produce even heat along said length.

44. The radiant heater as defined in claim 25, further including first and second end plates having inner and outer surfaces, said elongated burner, said elongated inner member and said first and second elongated emitters extending at least partially between said first and second end plates, said inner surfaces of first portions of said first and second end plates forming end boundaries to said combustion chamber such that said first portions of said first and second end plates restrict the flow of the produced heat and gases in said combustion chamber out of ends of said radiant heater, wherein said first and second elongated emitters each provide a screen portion having a plurality of perforations therethrough in order to allow the produced heat and the gases to exit said combustion chamber, and further including at least one deflector which extends outwardly from at least one of said outer surfaces of second portions of said first and second end plates which do not define end boundaries to said combustion chamber but which are positioned exterior to at least one of said first and second elongated emitters, said at least one deflector configured to disperse and dilute gases that have exited said combustion chamber, wherein said radiant heater is suspended in position above a floor by an overhead support, said radiant heater configured to be positioned proximate to the overhead support as gases are dispersed and diluted out of said ends of said radiant heater, as opposed to a top of said radiant heater, by said at least one deflector.

45. The radiant heater as defined in claim 44, wherein said canopy further extends over said first and second elongated emitters, said canopy further being configured to prevent the exhaustion of heat and gases out of a top portion thereof, thereby further allowing said radiant heater to be positioned proximate to the overhead support.

46. The radiant heater as defined in claim 34, wherein said radiant heater is suspended in position above a floor by an overhead support, said radiant heater configured to be positioned proximate to the overhead support as said gases are dispersed and diluted out of said ends of said radiant heater, as opposed to a top of said radiant heater, by said at least one deflector.

47. The radiant heater as defined in claim 40, wherein said radiant heater is suspended in position above a floor by an overhead support, said radiant heater configured to be positioned proximate to the overhead support as said canopy is further configured to prevent the exhaustion of heat and gases out of a top portion thereof.

48. A radiant heater configured to be suspended by an overhead support above a floor at a predetermined distance which is proximate to the overhead support, said radiant heater comprising:
- an elongated burner having a top, a bottom, a first end wall, a second end wall, a first elongated side wall and a second elongated side wall, said first and second elongated side walls having multiple ports extending along a length thereof, which generally extends from a first end of said radiant heater to a second end of said radiant heater;
- a gas control device located proximate said first end of said elongated burner;
- an elongated inner member having a an elongated base and at least one elongated leg member which extends upwardly and outwardly from said elongated base, said elongated base extending along said length of said elongated burner and being generally positioned above said elongated burner, said elongated inner member defining an elongated inner cavity;
- insulation provided within said elongated inner cavity;
- an elongated emitter, said elongated emitter, said elongated burner, said elongated base of said elongated inner member and said at least one elongated leg member of said elongated inner member defining a combustion chamber therebetween; and
- a canopy which extends over said elongated inner member and said elongated emitter;
- wherein said elongated burner, said gas control device, said elongated inner member, said elongated emitter and said canopy are operatively associated with one another to produce heat and to direct a substantial portion of the produced heat toward the floor in such a manner as to produce a zone of heat on the floor within a predetermined temperature range.

49. The radiant heater as defined in claim 48, wherein said at least one emitter assembly is positioned to direct a substantial portion of the produced heat toward the floor in such a manner as to produce a generally quadrangular zone of heat within a predetermined temperature range on the floor.

50. The radiant heater as defined in claim 48, wherein said burner is elongated and generally extends from a first end of said radiant heater to a second end of said radiant heater.

51. The radiant heater as defined in claim 50, wherein said elongated burner has a plurality of ports provided along a length thereof which are sized and arranged to produce even heat along said length.

* * * * *